US010926676B2

(12) United States Patent
Dotzler et al.

(10) Patent No.: US 10,926,676 B2
(45) Date of Patent: Feb. 23, 2021

(54) VEHICLE SEAT

(71) Applicant: GRAMMER AG, Amberg (DE)

(72) Inventors: Florian Dotzler, Hirschau (DE); Erwin Haller, Birgland (DE); Konstantin Krivenkov, Amberg (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/591,967

(22) Filed: Oct. 3, 2019

(65) Prior Publication Data

US 2020/0108751 A1 Apr. 9, 2020

(30) Foreign Application Priority Data

Oct. 4, 2018 (DE) .......................... 102018124512.2

(51) Int. Cl.
| | | |
|---|---|---|
| *B60N 2/50* | (2006.01) | |
| *B60N 2/52* | (2006.01) | |
| *B60N 2/54* | (2006.01) | |

(52) U.S. Cl.
CPC ............. *B60N 2/508* (2013.01); *B60N 2/502* (2013.01); *B60N 2/505* (2013.01); *B60N 2/509* (2013.01); *B60N 2/522* (2013.01); *B60N 2/54* (2013.01)

(58) Field of Classification Search
CPC ........ B60N 2/508; B60N 2/502; B60N 2/505; B60N 2/509; B60N 2/522; B60N 2/54; B60N 2/1665; B60N 2/162; B60N 2/52; B60N 2/39
USPC ...... 248/421, 564, 575, 588; 297/338, 344.1
See application file for complete search history.

(56) References Cited

U.S. PATENT DOCUMENTS

| | | | |
|---|---|---|---|
| 3,847,338 A | | 11/1974 | Adams |
| 4,645,169 A | * | 2/1987 | Mischer ................. B60N 2/525 248/550 |
| 4,856,763 A | * | 8/1989 | Brodersen ............. B60N 2/502 267/131 |

(Continued)

FOREIGN PATENT DOCUMENTS

| | | |
|---|---|---|
| DE | 2309808 | 9/1973 |
| DE | 20101762 | 5/2001 |

(Continued)

OTHER PUBLICATIONS

Extended Search Report for European Patent Application No. 19200998.3, dated Jun. 17, 2020, 3 pages.

(Continued)

*Primary Examiner* — Muhammad Ijaz
(74) *Attorney, Agent, or Firm* — Sheridan Ross P.C.

(57) ABSTRACT

A vehicle seat having a vehicle seat underbody, comprising: a base plate; a side horizontal suspension; a rolling suspension comprising a rod element rotatably mounted with respect to the side horizontal suspension; a scissors-type frame having a first swing and a second swing, wherein the first swing is connected by a first slide element to the rod element and the second swing is connected by a second slide element to the rod element and the first swing is connected to the first slide element and the second swing is connected to the second slide element; a first element carrier; a lengthwise horizontal suspension; and a first spring element, which is connected on the one hand to the first element carrier and on the other hand to the base plate or one of the swings.

12 Claims, 12 Drawing Sheets

(56) References Cited

U.S. PATENT DOCUMENTS

| | | | | |
|---|---|---|---|---|
| 5,251,864 A * | 10/1993 | Itou | ............... | B60N 2/502 248/588 |
| 5,957,426 A * | 9/1999 | Brodersen | ............... | B60N 2/502 248/421 |
| 6,366,190 B1 * | 4/2002 | Fujita | ............... | F16F 6/005 248/564 |
| 6,550,740 B1 | 4/2003 | Burer | | |
| 6,616,117 B2 * | 9/2003 | Gryp | ............... | B60N 2/501 248/421 |
| 7,000,910 B2 * | 2/2006 | Oshimo | ............... | F16F 3/02 267/131 |
| 7,568,675 B2 * | 8/2009 | Catton | ............... | B60N 2/502 248/421 |
| 7,988,232 B2 * | 8/2011 | Weber | ............... | B60N 2/162 297/344.15 |
| 8,800,976 B2 * | 8/2014 | Bethina | ............... | B60N 2/544 267/131 |
| 9,527,416 B2 * | 12/2016 | Brodersen | ............... | B60N 2/508 |
| 9,644,378 B2 * | 5/2017 | Knox | ............... | B60N 2/24 |
| 9,694,727 B2 * | 7/2017 | Haller | ............... | B60N 2/165 |
| 9,758,078 B2 * | 9/2017 | Haller | ............... | B60G 17/08 |
| 9,809,136 B2 * | 11/2017 | Haller | ............... | B60N 2/164 |
| 9,937,832 B2 * | 4/2018 | Haller | ............... | B60N 2/527 |
| 10,012,286 B2 * | 7/2018 | Haller | ............... | B60N 2/522 |
| 10,583,753 B2 * | 3/2020 | Lorey | ............... | B60N 2/0715 |
| 10,654,381 B2 * | 5/2020 | Lorey | ............... | B60N 2/502 |
| 2004/0090100 A1 * | 5/2004 | Igarashi | ............... | B60N 2/544 297/344.15 |
| 2010/0224343 A1 * | 9/2010 | Fukuma | ............... | B65G 49/067 165/67 |
| 2011/0226930 A1 * | 9/2011 | Enns | ............... | B60N 2/508 248/569 |
| 2011/0284713 A1 * | 11/2011 | Ellerich | ............... | B60N 2/52 248/421 |
| 2012/0097822 A1 * | 4/2012 | Hammarskiold | ............... | B60N 2/502 248/421 |
| 2013/0140865 A1 * | 6/2013 | Shin | ............... | B60N 2/508 297/344.12 |
| 2013/0206949 A1 * | 8/2013 | Archambault | ............... | B60N 2/508 248/421 |
| 2014/0091191 A1 * | 4/2014 | Romera Carrion | ............... | A47C 3/20 248/421 |
| 2015/0232005 A1 * | 8/2015 | Haller | ............... | B60N 2/525 248/562 |
| 2016/0200230 A1 * | 7/2016 | Haller | ............... | B60G 99/002 296/190.08 |
| 2016/0207430 A1 * | 7/2016 | Haller | ............... | B60N 2/0232 |
| 2016/0214658 A1 * | 7/2016 | Haller | ............... | B60N 2/522 |
| 2020/0108751 A1 * | 4/2020 | Dotzler | ............... | B60N 2/502 |
| 2020/0122612 A1 * | 4/2020 | Fillep | ............... | B60N 2/525 |

FOREIGN PATENT DOCUMENTS

| | | |
|---|---|---|
| DE | 102015121764 | 8/2017 |
| EP | 3181396 | 6/2017 |

OTHER PUBLICATIONS

Official Action for German Patent Application No. 102018124512.2, dated Jun. 7, 2019, 3 pages.

* cited by examiner

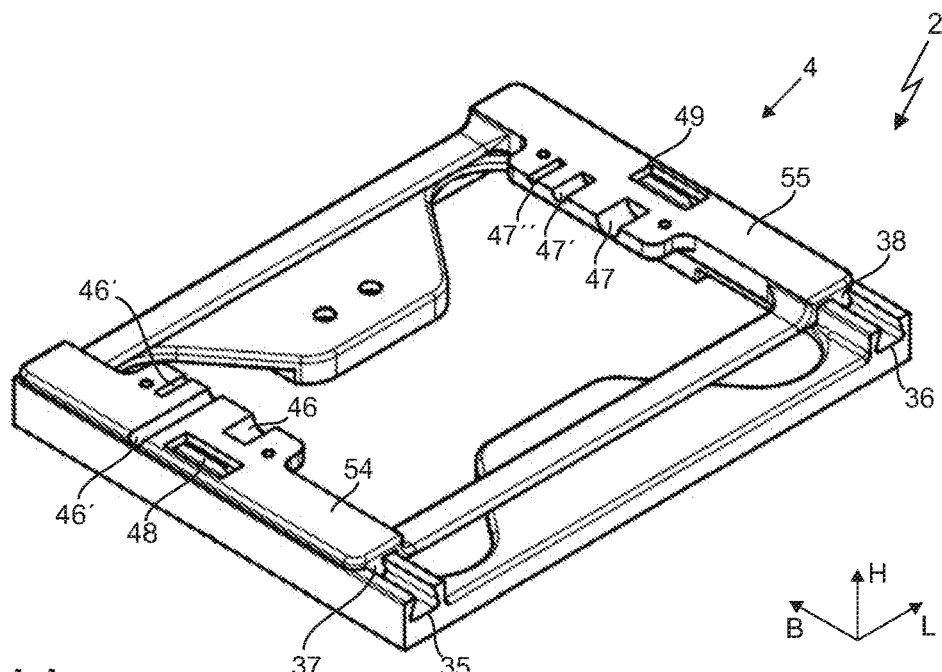
Fig. 6AA
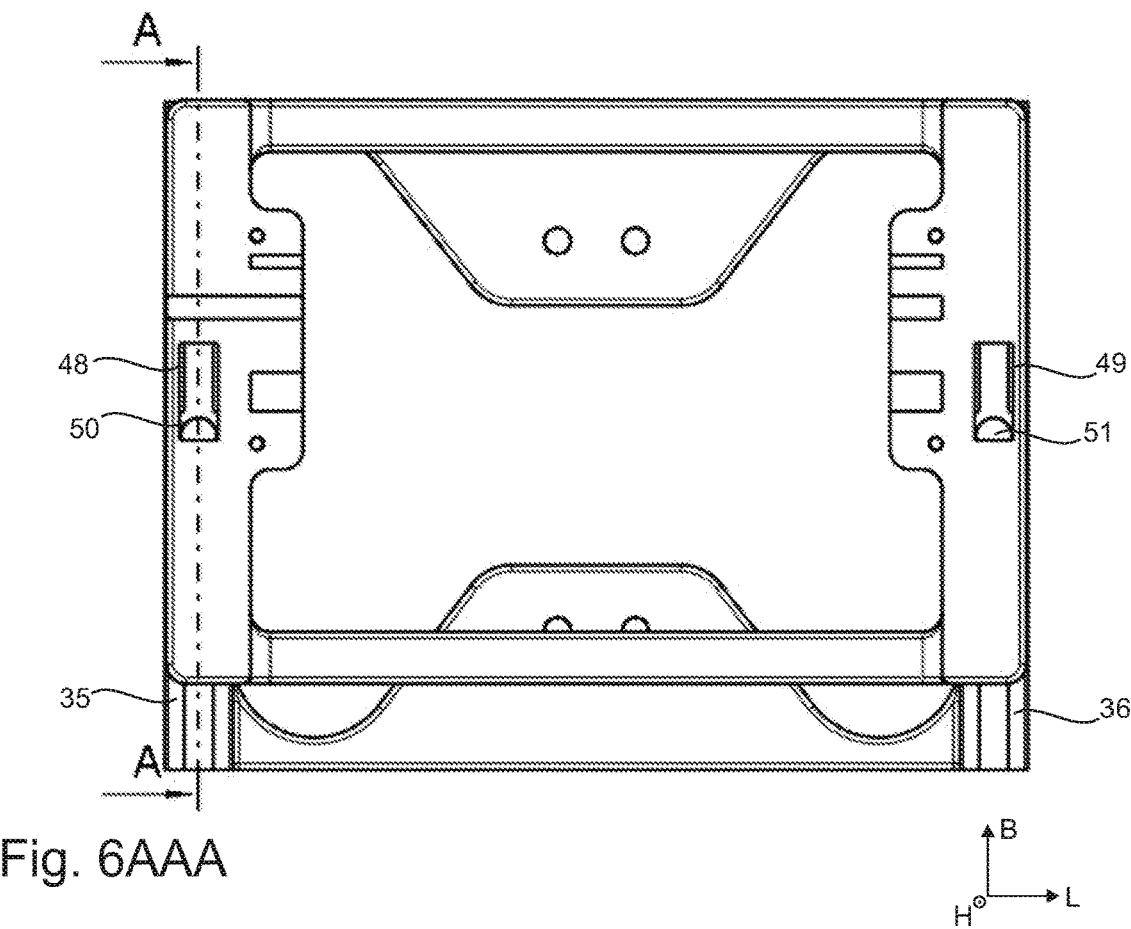
Fig. 6AAA

VEHICLE SEAT

CROSS-REFERENCE TO RELATED APPLICATION

This application claims the benefit of German Patent Application No. DE 10 2018 124 512.2 filed Oct. 4, 2018, the entire disclosure of which is incorporated herein by reference.

FIELD

The invention relates to a vehicle seat having a vehicle seat underbody, wherein the vehicle seat is designed and suitable for performing and cushioning various movements.

BACKGROUND

Vehicle seats are known in the prior art that are equipped with various spring systems, for example, for side horizontal movements or vertical movements. The drawback to this type of vehicle seats is that a lot of room is required in order to mount the respective spring mechanisms.

Therefore, the problem which the present invention proposes to solve is to provide a vehicle seat with a more simple design than those in the prior art.

SUMMARY

The underlying problem of the present application is solved by the features of the present disclosure.

The key idea of the present invention is to provide a vehicle seat having a vehicle seat underbody, wherein the vehicle seat comprises:
a base plate; a side horizontal suspension connected to the base plate for cushioning movements of the vehicle seat in the vehicle seat width direction; a rolling suspension for cushioning rolling movements of the vehicle seat comprising a rod element rotatably mounted with respect to the side horizontal suspension; a scissors-type frame having a first swing, comprising a first swing arm and a second swing arm, and a second swing, comprising a third swing arm and a fourth swing arm, wherein the first swing is connected by means of a first displacement element to the rod element and the second swing is connected by means of a second displacement element to the rod element in movable manner and the first swing is connected rotatably about a first axis of rotation to the first displacement element and the second swing is connected rotatably about a second axis of rotation to the second displacement element; a first element carrier, which joins together on the one hand the first swing arm and the third swing arm and on the other hand the second swing arm and the fourth swing arm. Preferably, the vehicle seat underbody further comprises a lengthwise horizontal suspension for cushioning movements of the vehicle seat in the vehicle seat lengthwise direction; and further preferably a first spring element, which is connected on the one hand to the first element carrier and on the other hand to the base plate or one of the swings for cushioning movements of the vehicle seat during pitching movements and in the vehicle seat height direction.

Especially advantageously, the base plate is rigidly connected to a chassis of a vehicle or to a cabin of the vehicle. It is conceivable to be able to produce a rigid connection by means of screw connections, rivet connections, welded connections or the like.

According to the invention, a side horizontal suspension is connected to the base plate, by means of which movements of the vehicle seat in the side direction, i.e., in the vehicle seat width direction, can be cushioned.

The side horizontal suspension is preferably connected by means of a rail arrangement to the base plate, so that the side horizontal suspension can be moved relative to the base plate. Especially preferably, a first guide rail and a second guide rail are provided on the base plate, and accordingly a first slide rail, which is connected to the first guide rail, and a second slide rail, which is connected to the second guide rail. Especially advantageously, the guide rails and accordingly the slide rails are configured such that a dovetail guidance is possible, that is, the guide rails are respectively formed as dovetails and the slide rails are complementary to them.

Further, it is preferably provided that a free space is provided in the rail elements, especially between the guide rails and slide rails, in which corresponding spring elements can be introduced.

Further according to the invention, a rolling suspension is provided, by means of which rolling movements of the vehicle seat can be cushioned. The rolling suspension comprises a rod element which is rotatably mounted with respect to the side horizontal suspension. Especially preferably, the rod element is rotatably connected to the side horizontal suspension. Thus, the side horizontal suspension and the rolling suspension are formed integrally to each other.

According to an especially preferred embodiment, the rod element is configured as a profiled shaft, which has cylindrical projections at its ends, which are rotatably connected to the side horizontal suspension. Especially preferably, the rod element is configured as a square profile.

Preferably, the rod element extends in the vehicle seat lengthwise direction.

Especially advantageously, the rolling suspension comprises at least one spring rod, which stands in operative contact with the rod element by means of a connection piece. The connection piece can be moved relative to the rod element in the direction of the extension of the rod element, i.e., preferably in the vehicle seat lengthwise direction. The spring rod is advantageously rigidly connected to the side horizontal suspension.

The rolling suspension is moved accordingly by a rolling movement of the vehicle, that is, in the present case, the rod element is rotated relative to the side horizontal suspension. Thanks to this rotation, the connection piece is rotated due to the connection to the rod element likewise relative to the side horizontal suspension and exerts a deformation on the spring rod, especially an elastic deformation, whereby a restoring force is produced by the spring rod.

Likewise according to the invention, a scissors-type frame is provided, having a first swing, comprising a first swing arm and a second swing arm, and a second swing, comprising a third swing arm and a fourth swing arm.

Further, the first swing is connected by means of a first displacement element in movable manner to the rod element. Likewise, the second swing is connected by means of a second displacement element in movable manner to the rod element. Furthermore, the first swing is connected rotatably about a first axis of rotation to the first displacement element and the second swing is connected rotatably about a second axis of rotation to the second displacement element.

Preferably, the first and the second swing arm are arranged between the third and the fourth swing arm, looking in the vehicle seat width direction.

It should be noted that the first swing and the second swing are not joined by a common axis of rotation; that is, the first swing and the second swing can be moved independently of each other.

However, it is provided according to the invention that a first element carrier is provided, which joins together the first swing arm and the third swing arm as well as the second swing arm and the fourth swing arm. A movement of one of the swings therefore causes a movement of the other swing.

The preferably provided first spring element, which is connected on the one hand to the first element carrier and on the other hand to the base plate or one or both of the swings, is provided for cushioning pitching movements of the vehicle seat and movements of the vehicle seat in the vehicle seat height direction, i.e., in the vertical direction.

According to an especially preferred embodiment, the vehicle seat underbody comprises a first damping element, which is connected on the one hand to the first element carrier and on the other hand to the first swing or the second swing. In this way, it is possible to dampen even further the corresponding movements of the vehicle seat in addition to the suspension.

Further preferably, a second damping element may be provided, which is connected on the one hand to the first element carrier and on the other hand to the first swing or the second swing. It is advantageous for the second damping element to be arranged on the swing on which the first damping element is not arranged. For example, if the first damping element is connected to the first swing, then the second damping element is connected to the second swing.

The lengthwise horizontal suspension according to one especially preferred embodiment is connected by means of loose bearings to the first swing and the second swing. This means that the swings are each connected by a loose bearing to the rod element and each by loose bearings to the lengthwise horizontal suspension. Especially preferably, the lengthwise horizontal suspension is also a top piece of the vehicle seat underbody at the same time.

It is therefore necessary to provide further elements by means of which the now statically undetermined scissors-type frame is limited in its degrees of freedom. According to one preferred embodiment, a first connecting rod element is provided, which is rotatably connected to the rod element about a third axis of rotation and to one of the swings about a fourth axis of rotation, preferably to the second swing.

According to another preferred embodiment, a first spacing of the third axis of rotation from the fourth axis of rotation is equal to a second spacing of the second axis of rotation from the fourth axis of rotation and equal to a third spacing of the fourth axis of rotation from a centre axis of the third swing arm or a middle bearing of the third swing arm. Thanks to this arrangement, the centre axis is thus guided substantially exactly by the third axis of rotation, so that no horizontal displacement of the centre axis relative to the third axis of rotation will occur.

The terms middle bearing and centre axis can be used here synonymously.

The centre axis may in theory be chosen arbitrarily. Thanks to the position of the centre axis, the transmission of the swing from the overall travel of the top piece to the bottom piece to the travel of the first spring element, preferably arranged between the first element carrier and the second element carrier or the base plate, is determined.

An exact guidance as described above is achieved when the centre axis, the fourth axis of rotation and the second axis of rotation lie on a common length and the fourth axis of rotation describes the half length of the distance from the centre axis to the second axis of rotation.

Especially advantageously, the first swing arm, the second swing arm, the third swing arm and the fourth swing arm have a centre axis, while the first element carrier is rotatably connected to the respective centre axis of the swing arms.

The first connecting rod element serves here as a fixed bearing of the scissors-type frame, so that the displacement elements and the loose bearings cannot move arbitrarily in the vehicle seat lengthwise direction.

Thanks to the arrangement of the first connecting rod element as a centering on a centre point, it is necessary for the first spacing to correspond to the second spacing and the third spacing. It is further necessary for the first connecting rod element to be connected to one of the outer swing arms, thus in the present case either to the third swing arm or the fourth swing arm.

Especially advantageously, the first connecting rod element is L-shaped. In this way, it can be achieved that the connecting rod element does not make contact with the second element carrier and thereby possibly be damaged. Further preferably, it is provided that the third axis of rotation of the first connecting rod element and the first axis of rotation of the first swing and the second axis of rotation of the second swing are situated in a horizontal plane, which is preferably formed from the vehicle seat lengthwise direction and the vehicle seat width direction.

According to another preferred embodiment, the vehicle seat underbody comprises a second element carrier, which is rigidly connected to the base plate and the first spring element is connected by means of the second element carrier to the base plate, with the second element carrier preferably extending in the vehicle seat width direction. Such a configuration is especially advantageous when the first spring element is designed as an elastically deformable pneumatic spring.

Especially advantageously, the first element carrier is partly arranged on the one hand between the first swing arm and the third swing arm and on the other hand between the second swing arm and the fourth swing arm.

According to another preferred embodiment, the first displacement element is configured as a first slide element and the second displacement element as a second slide element, which are connected in sliding manner to the rod element and are preferably made of plastic. Alternatively, the first displacement element may be configured as a first roller element and the second displacement element as a second roller element, which are connected in rolling manner to the rod element. In this way, it is possible to further reduce the friction of the displacement elements against the rod element.

BRIEF DESCRIPTION OF THE DRAWINGS

Further advantageous embodiments will emerge from the dependent claims.

Further goals, benefits and suitabilities of the present invention will be found in the following specification in connection with the drawings. There are shown.

DETAILED DESCRIPTION

Figure 1:
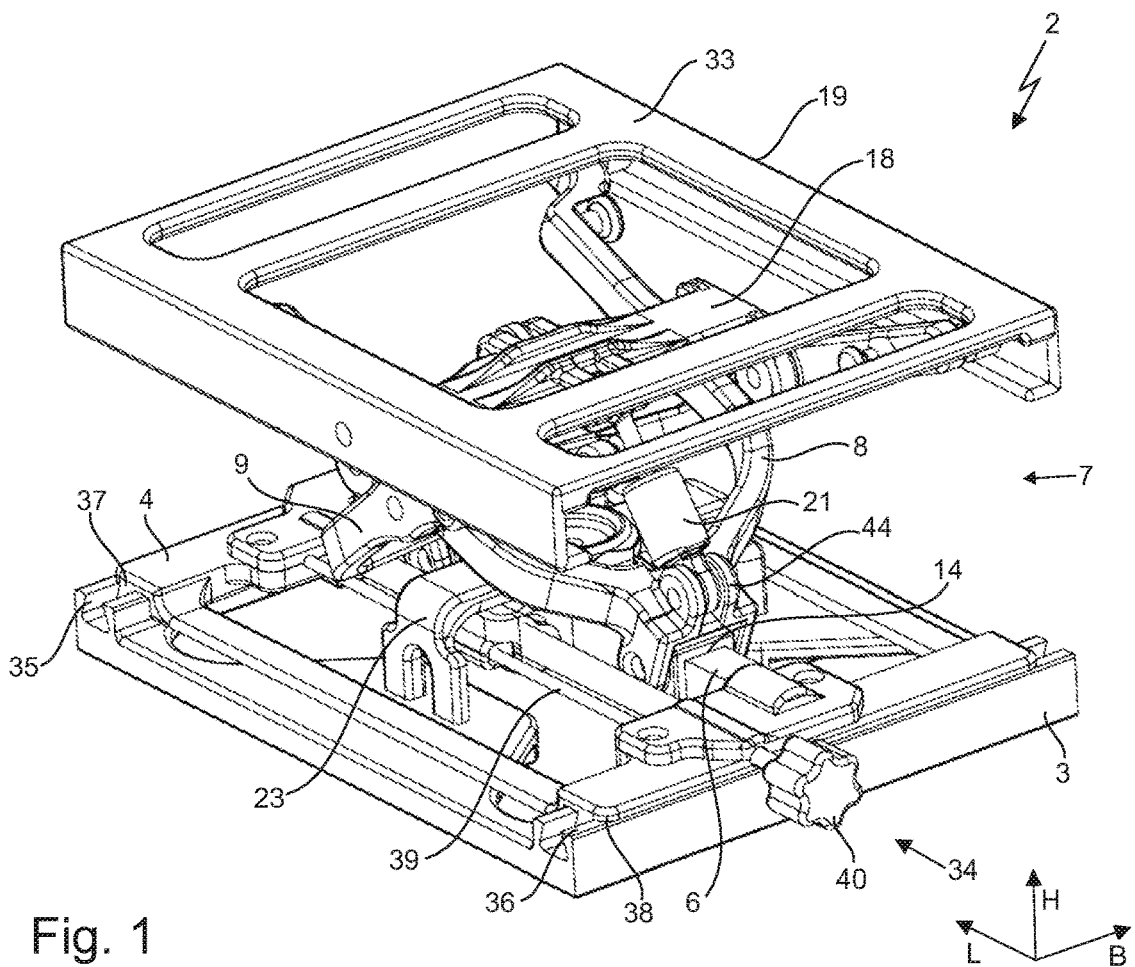
FIG. 1 a vehicle seat underbody in a perspective view.
Figure 2:
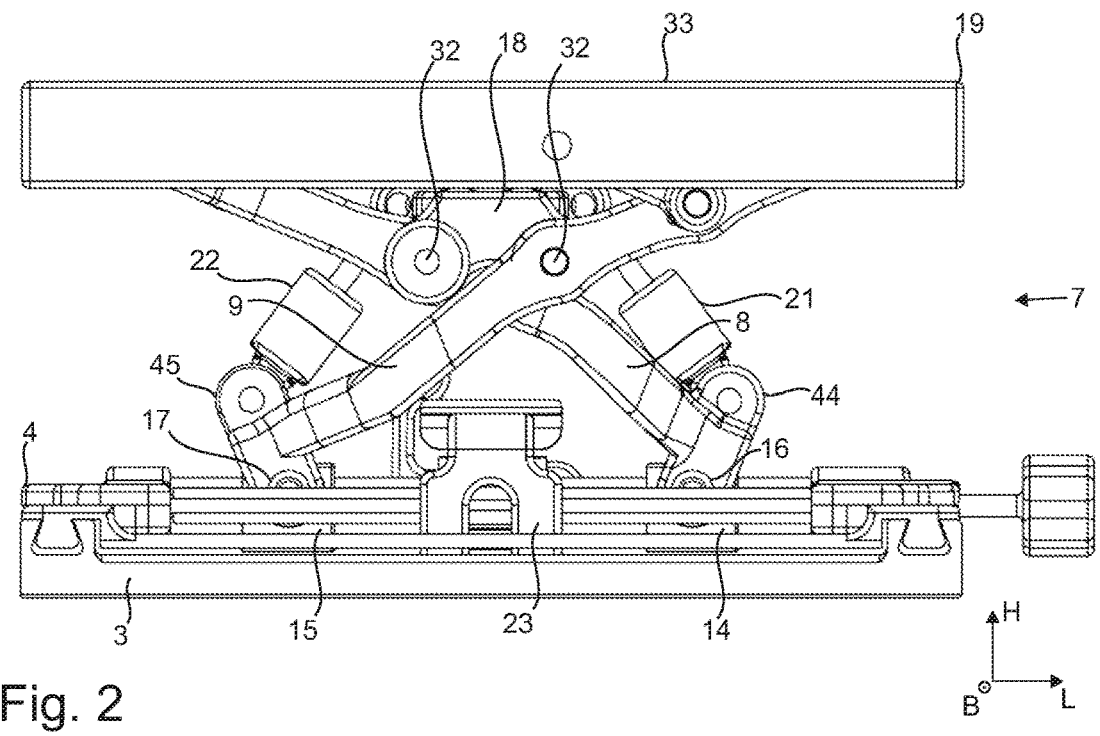
FIG. 2 the vehicle seat underbody of FIG. 1 in a side view.
Figure 3:
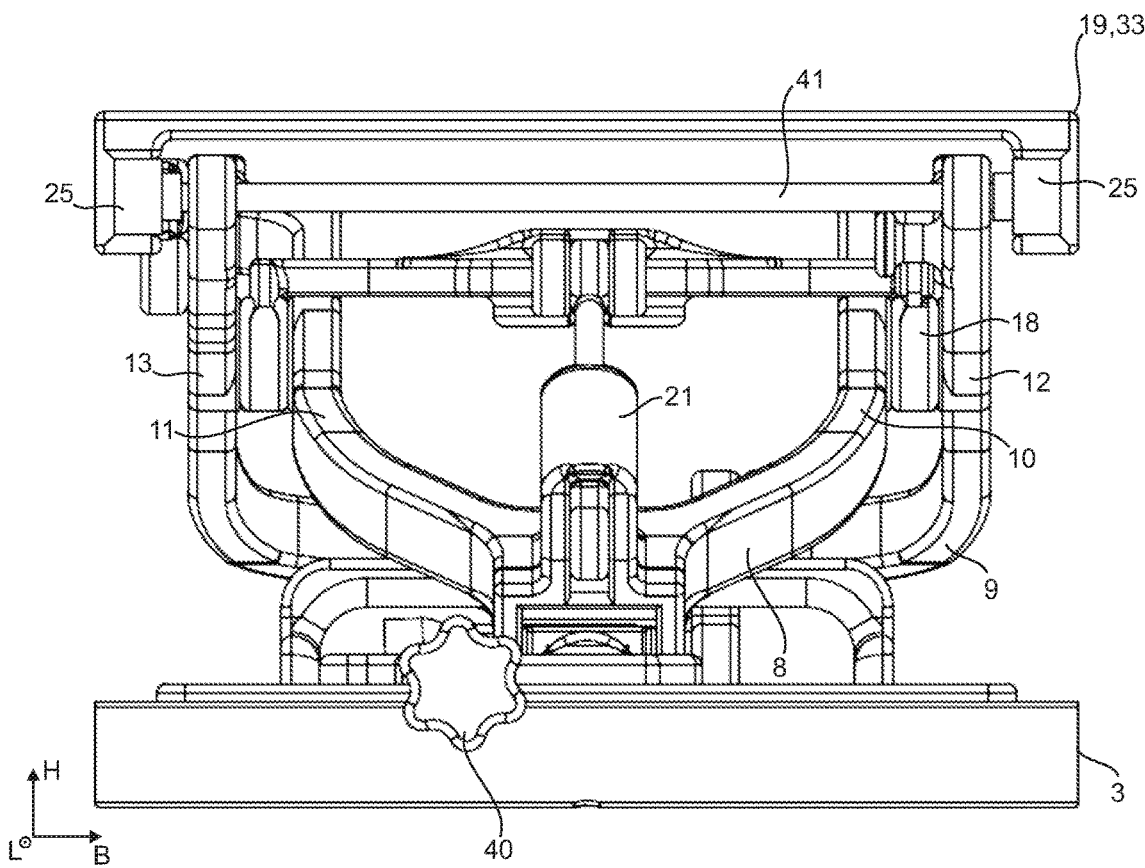
FIG. 3 the vehicle seat underbody of FIG. 1 in a front view.
Figure 4:
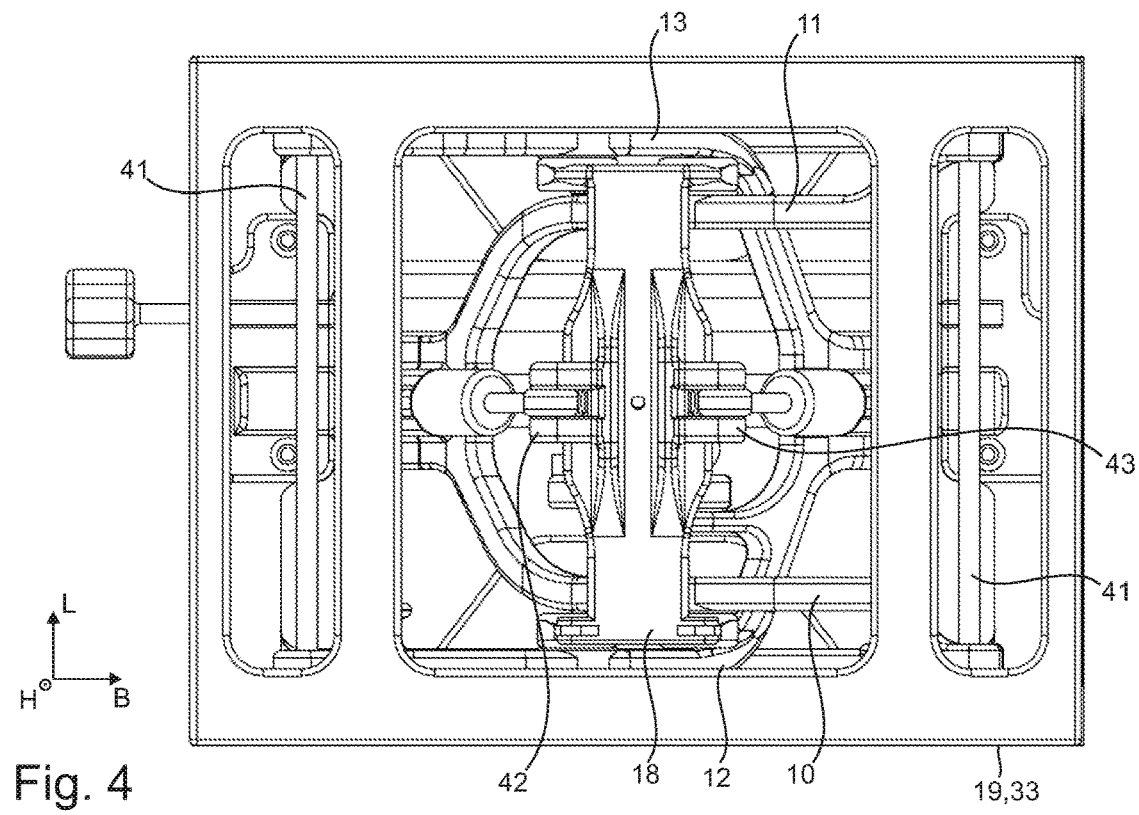
FIG. 4 the vehicle seat underbody of FIG. 1 in a top view.

FIGS. 1 to 4 show a vehicle seat underbody 2 for a vehicle seat 1 (not shown here) according to a preferred embodiment in various representations. FIG. 1 shows the vehicle seat underbody 2 in a perspective view, FIG. 2 shows the vehicle seat underbody 2 in a side view, FIG. 3 shows the vehicle seat underbody 2 in a front view and FIG. 4 shows the vehicle seat underbody 2 in a top view.

FIG. 1 shows the vehicle seat underbody 2, which comprises a base plate 3 on which a side horizontal suspension 4 is mounted. The base plate 3 comprises a first guide rail 35 and a second guide rail 36, in which a first slide rail 37 and a second slide rail 38 of the side horizontal suspension 4 are introduced. As can be recognized from the figures, the guide rails 35, 36 are dovetail shaped, and the slide rails 37, 38 are configured complementary to them. Therefore, a secure movement can be assured in the side horizontal suspension direction. The guide rails 35, 36 as well as the slide rails 37, 38 run in the vehicle seat width direction B.

Further, a first swing 8 and a second swing 9 can be recognized, the first swing 8 having a first swing arm 10 and a second swing arm 11 and the second swing 9 having a third swing arm 12 and a fourth swing arm 13. The first swing arm 10 and the second swing arm 11 are arranged, looking in the vehicle seat width direction B, between the third swing arm 12 and the fourth swing arm 13.

The first swing 8 is rotatably connected about a first axis of rotation 16 to a first displacement element 14, which is configured as a first slide element 14, being connected in sliding manner to a rod element 6. The second swing 9 is rotatably connected about a second axis of rotation 17 to a second displacement element 15, which is configured as a second slide element 15, being likewise connected in sliding manner to the rod element 6. The rod element 6 extends in the vehicle seat lengthwise direction L.

Furthermore, a lengthwise horizontal suspension 19 of the vehicle seat underbody 2 is provided, which is connected by means of loose bearings 25 to the scissors-type frame 7 and especially the first swing 8 and the second swing 9. Between two loose bearings 25 which are situated on the same swing 8, 9 there is provided a spacing lock 41, which in the present case is designed as a tube extending in the vehicle seat width direction B.

Further, a first element carrier 18 is provided, which is arranged extending in the vehicle seat width direction B. Likewise, the first element carrier 18 is connected pivotably on the one hand to the first swing arm 10 and the third swing arm 12 and to the second swing arm 11 and the fourth swing arm 13. In particular, the first element carrier 18 is partly arranged between the first swing arm 10 and the third swing arm 12 as well as the second swing arm 11 and the fourth swing arm 13.

Likewise, a first damping element 21 and a second damping element 22 are provided, which are connected by means of upper fastenings 42, 43 to the first element carrier 18 and by means of lower fastenings 44, 45 to the first swing 8 or the second swing 9, especially rotatably connected to them.

Thanks to the first damping element 21 and possibly the second damping element 22, it is possible to dampen the movements during a pitching movement and/or during a movement in the vehicle seat height direction H, i.e., in the vertical direction.

There is also provided a rotary knob 40, which can be turned to adjust the hardness or the spring rate of the rolling suspension 5. The rolling suspension 5 is presented more closely in the following figures.

The first damping element 21 is connected by means of a lower fastening 44 to the first swing 8 and by means of an upper fastening 42 to the first element carrier 18. Likewise, if provided, the second damping element 22 is connected by means of a lower fastening 45 to the second swing 9 and by means of an upper fastening 43 to the first element carrier 18. In particular, the first damping element 21 and the second damping element 22 are rotatably connected to the upper fastenings 42, 43 and the lower fastenings 44, 45.

In FIGS. 5A to 5E, the vehicle seat underbody 2 is shown in various possible movement representations due to corresponding forces acting on the vehicle seat 1 or the vehicle seat underbody 2.

In FIGS. 5A to 5E, the vehicle seat underbody 2 is shown in two different representations, where the broken line representation in each of FIGS. 5A to 5E pertains to a condition in which the vehicle seat 1 and accordingly the vehicle seat underbody 2 is not pivoted, displaced, or the like, that is, no force is acting on the vehicle seat 1 or the vehicle seat underbody 2. The solid lines pertain to particular movements which can be cushioned or dampened by means of the vehicle seat underbody 2 according to the invention.

Figure 5A:
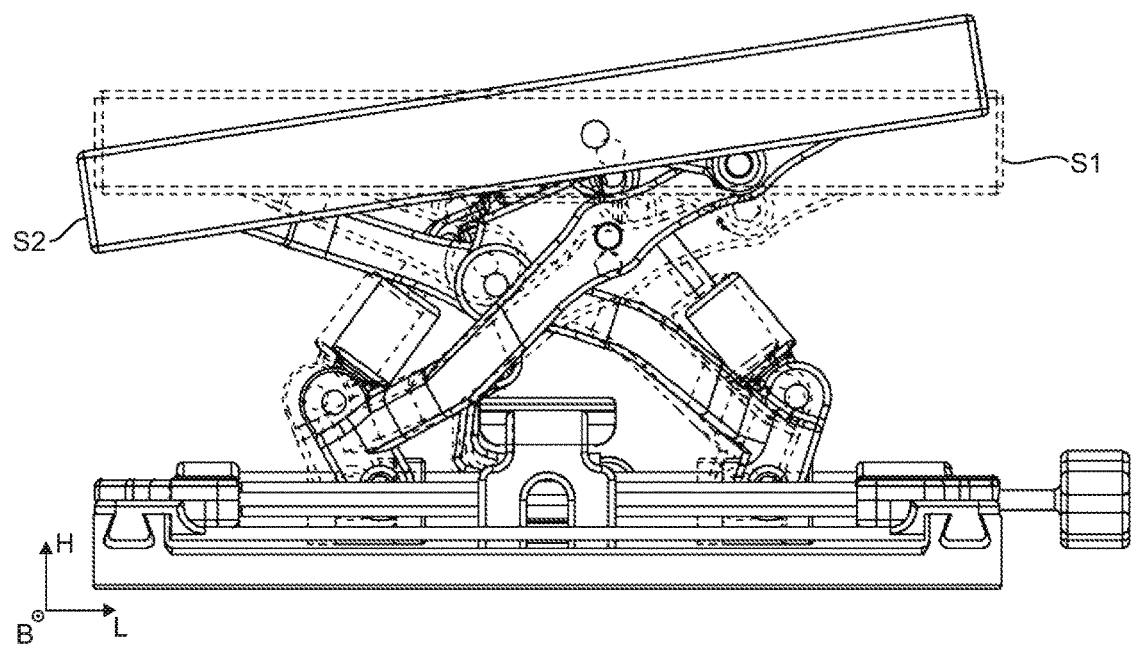
FIG. 5A-E the vehicle seat underbody in various movement positions; P FIG. 6A, 6AA, 6AAA-6M representations of various elements of the vehicle seat.

FIG. 5A shows the vehicle seat underbody 2 in a non-swiveled position S1 and in a swiveled position S2, showing a pitching movement of the vehicle seat 1 or the vehicle seat underbody 2.

Figure 5B:
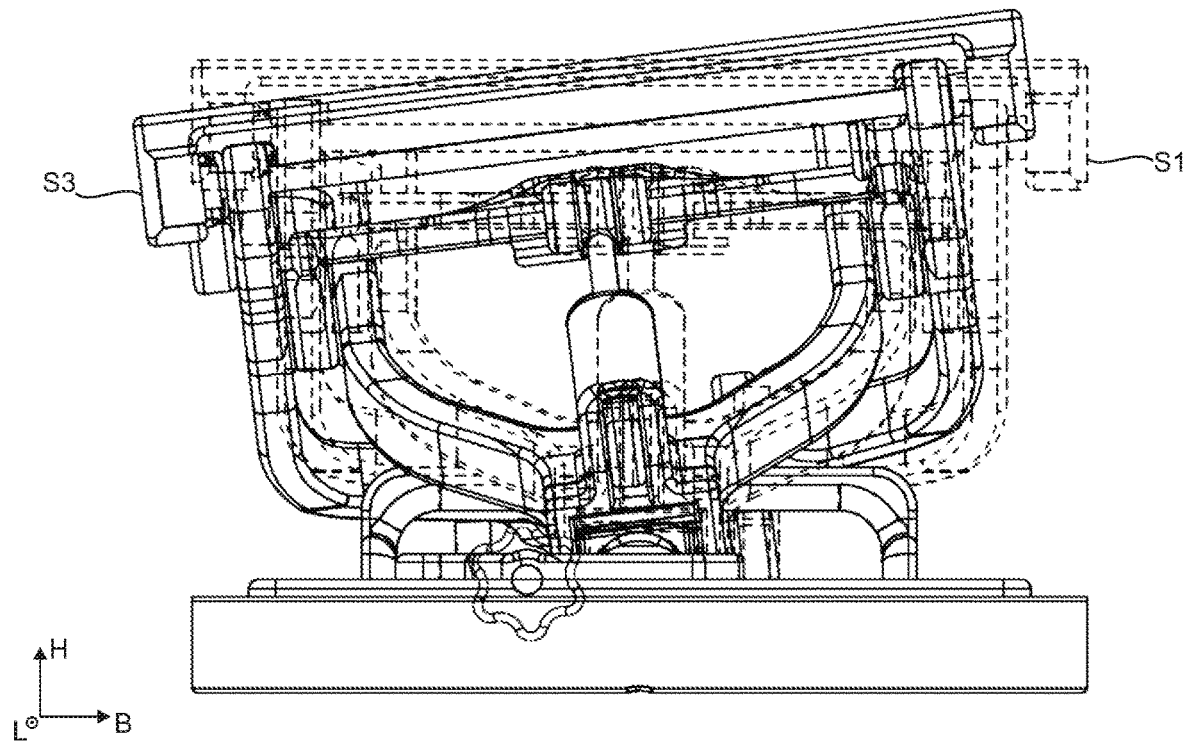

FIG. 5B shows the vehicle seat underbody 2 in a non-swiveled position S1 and in a swiveled position S3, showing a rolling movement of the vehicle seat 1 or the vehicle seat underbody 2.

Figure 5C:
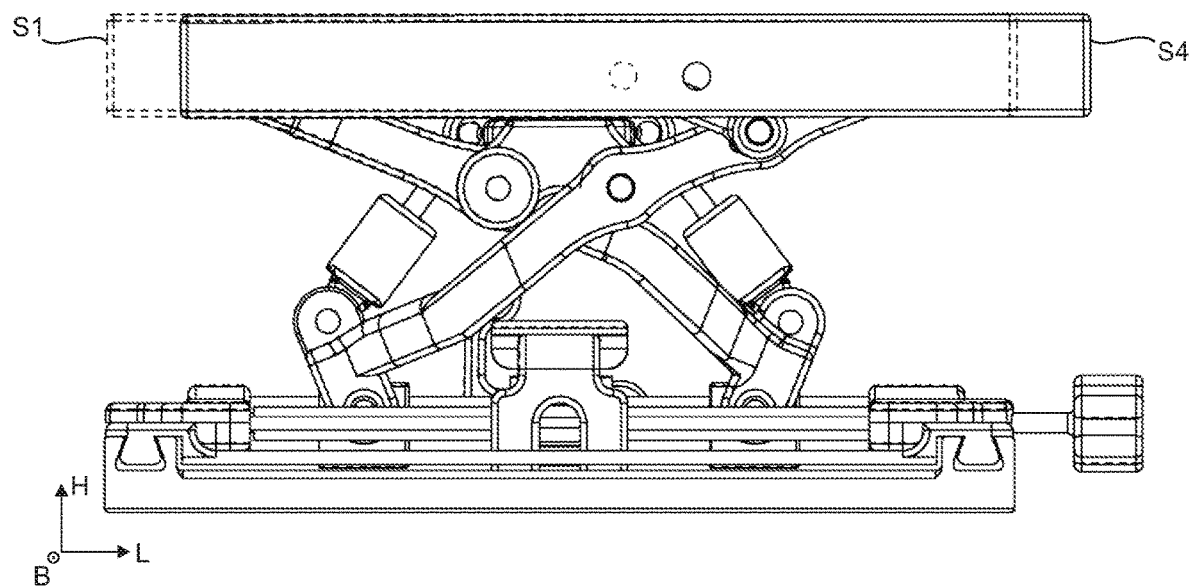

FIG. 5C shows the vehicle seat underbody 2 in a non-swiveled position S1 and in a swiveled position S4, showing a lengthwise horizontal suspension of the vehicle seat 1 or the vehicle seat underbody 2.

Figure 5D:
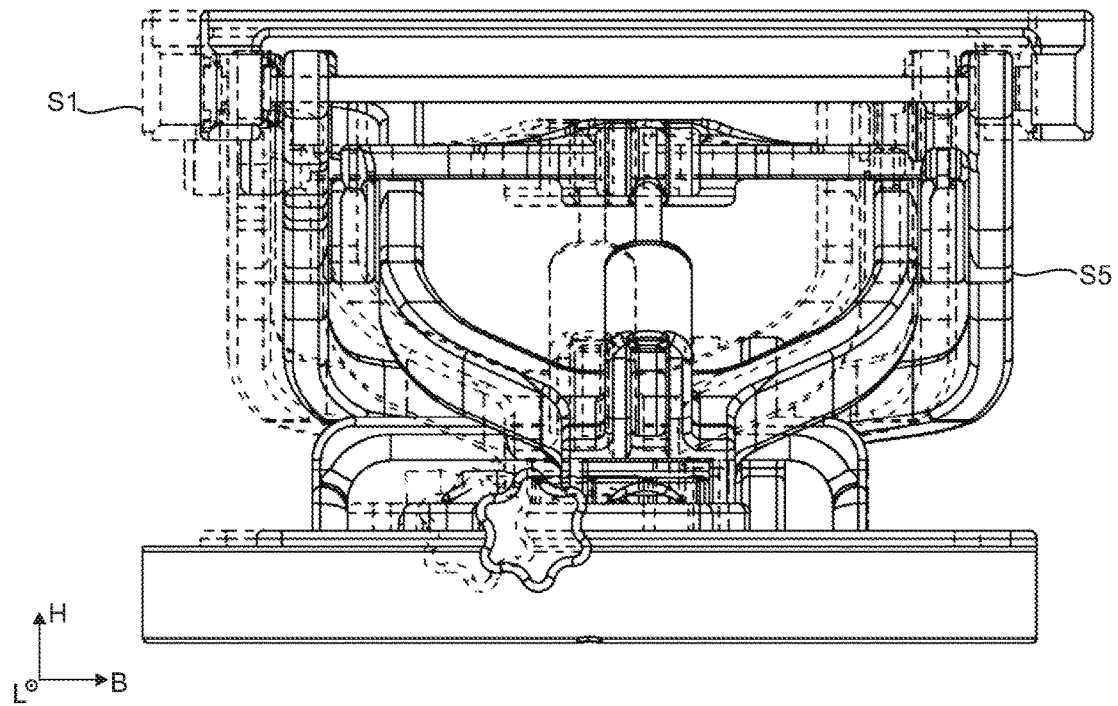

FIG. 5D shows the vehicle seat underbody 2 in a non-swiveled position S1 and in a swiveled position S5, showing a side horizontal suspension of the vehicle seat 1 or the vehicle seat underbody 2.

Figure 5E:
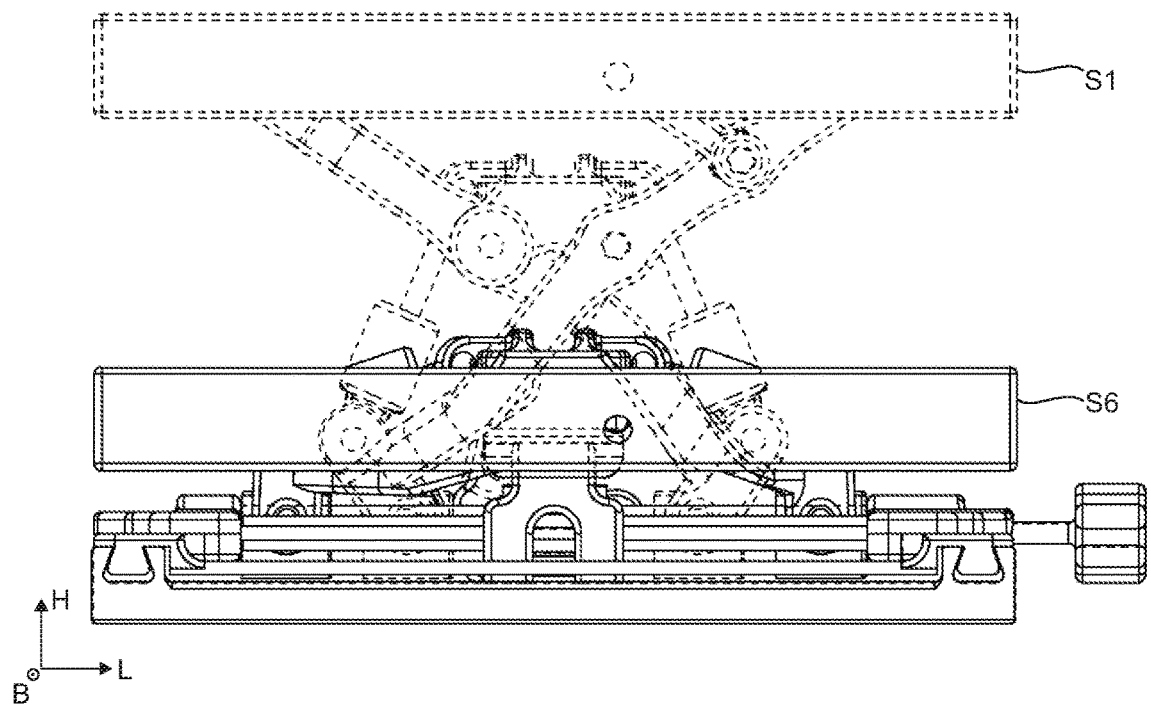

FIG. 5E shows the vehicle seat underbody 2 in a non-swiveled position S1 and in a swiveled position S6, showing a vertical suspension of the vehicle seat 1 or the vehicle seat underbody 2.

Summarizing, it is possible by means of the vehicle seat underbody as depicted to be able to respond to every possible movement of the vehicle seat and to cushion or to cushion and dampen the corresponding movement.

In FIGS. 6A to 6M, the preceding FIGS. 1 to 4 are again presented in more detailed form.

Figure 6A:
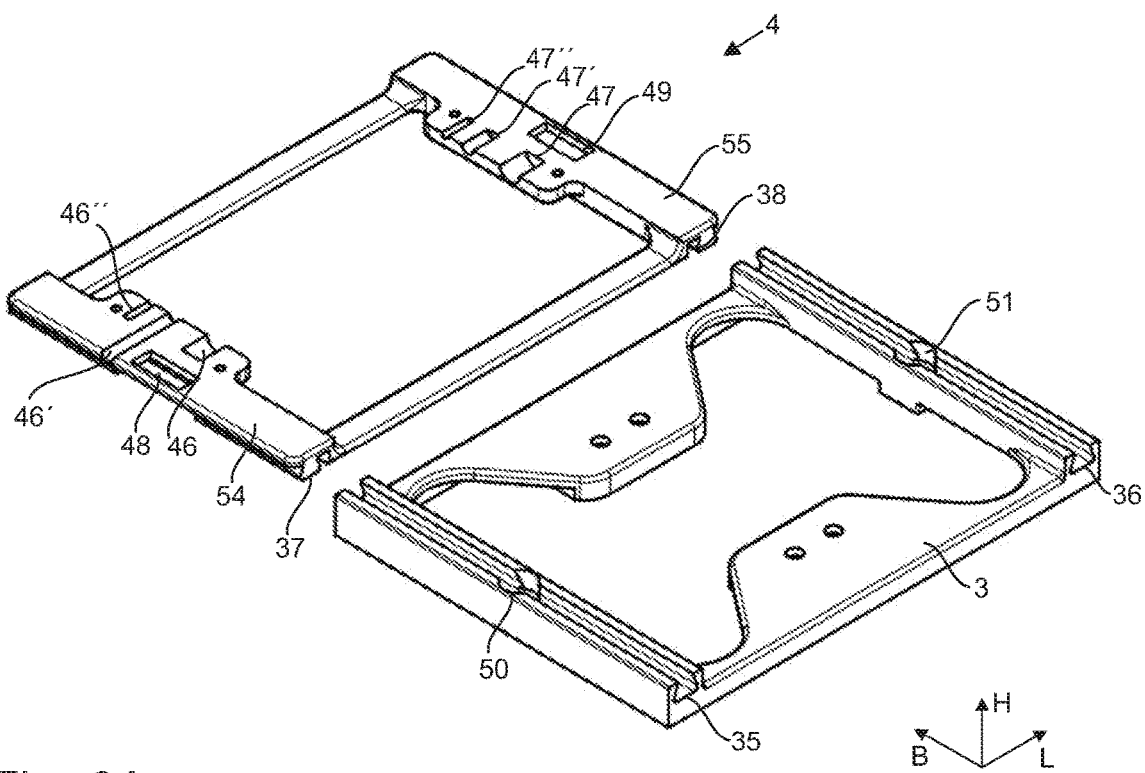

FIG. 6A shows, in an exploded view, the base plate 3 with a first guide rail 35 and a second guide rail 36, in which the first slide rail 37 and the second slide rail 38 have been shoved accordingly. The slide rails 37, 38 are parts of the side horizontal suspension 4. The base plate 3 has a first passageway 50 and a second passageway 51 respectively in the region of the first guide rail 35 and the second guide rail 36, through which screw connections 52 (not shown here) can be inserted.

Further, the side horizontal suspension 2 comprises a first base plate 54 as well as a second base plate 55, which are preferably spaced apart from each other. Further preferably, the first base plate 54 is arranged, looking in the vehicle seat height direction H, above the first slide rail 37, and the second base plate 55 is arranged, looking in the vehicle seat height direction H, above the second slide rail 38.

The first base plate 54 comprises first recesses 46, 46', 46", which are preferably formed as a circular arc and especially preferably as a semicircle. The second base plate 55 comprises second recesses 47, 47', 47", which are preferably formed as a circular arc and especially preferably as a semicircle. The recesses 46, 47 as well as 46' and 47' and 46" and 47" are formed opposite each other and extending in the vehicle seat lengthwise direction L.

Moreover, the first base surface 54 comprises a first breach 48 and the second base surface 55 comprises a second breach 49.

Figure 6B:
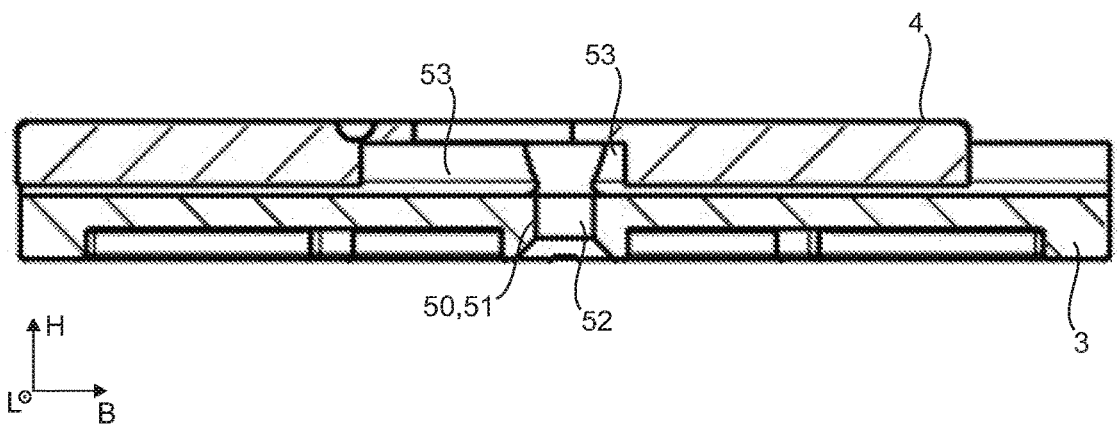

The meanings and advantages of the breaches 48, 49 and the passageways 50, 51 shall be presented more closely with the aid of FIG. 6B.

FIG. 6AA shows the exploded view of FIG. 6A in an assembled state. FIG. 6AAA on the other hand shows the subject of FIG. 6AA in a top view. It should be noted that the side horizontal suspension 2 of FIGS. 6AA and 6AAA has been displaced slightly from a neutral position.

FIG. 6B shows a cut-out from a cross section along line A-A of the assembled representation of FIG. 6AAA.

As can be seen, a screw connection 52 has been inserted in the passageway 50, 51, which extends beyond the base plate 3, looking in the vehicle seat height direction H; that is, the screw connection 52 protrudes into the slide rail 37, 38. The slide rails 37, 38, however, have material removed from them, forming a free space 53, so that the screw connection 52 does not stand in contact with the slide rail 37, 38. The breach 48, 49 is situated, looking in the vehicle seat height direction H, above the screw connection 52, at least in a non-displaced position of the side horizontal suspension 2.

By means of the breaches 48, 49, it is possible to introduce spring elements into the free spaces 53 in the rail arrangement 35, 36, 37, 38, which then stand in connection on the one hand with the slide rail 37, 38 and on the other hand with the screw connection 52.

Figure 6C:
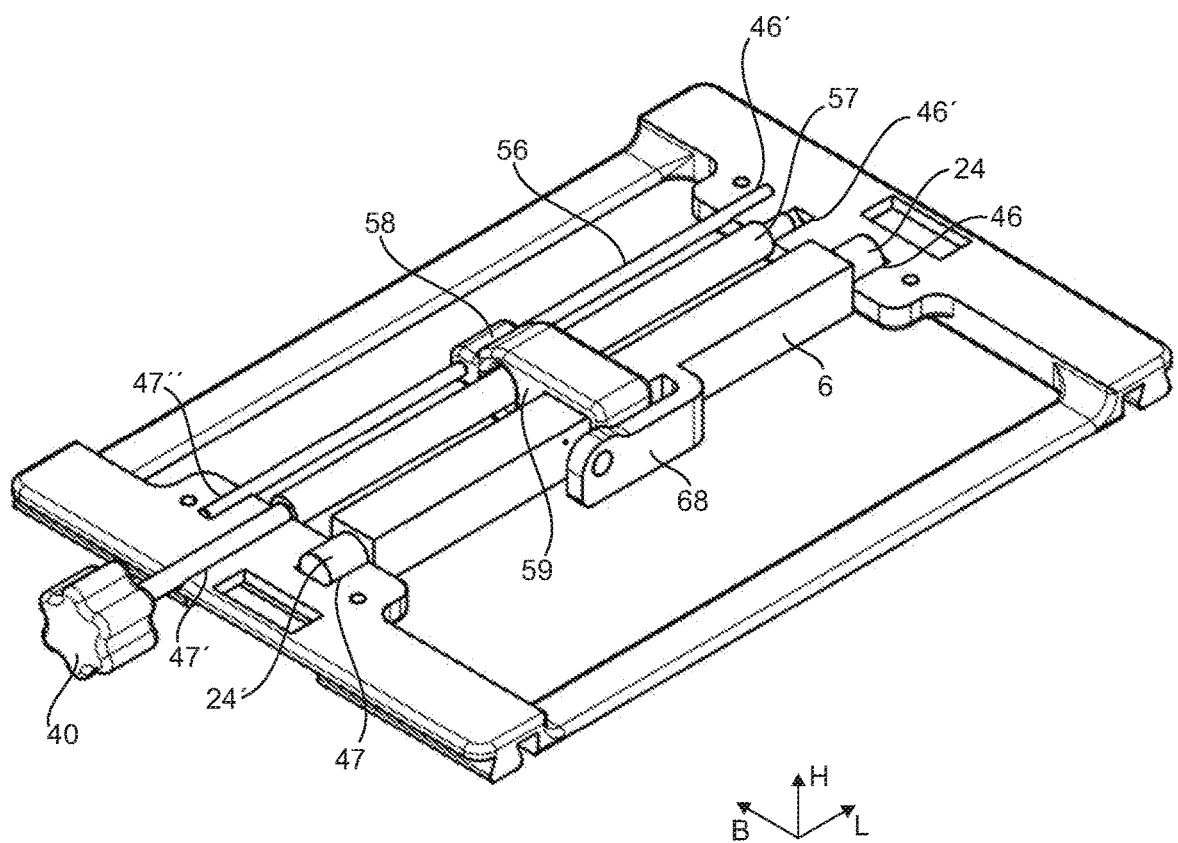

FIG. 6C shows the underlying rolling suspension 5 more closely. The rolling suspension 5 comprises a rod element 6, which is arranged extending in the vehicle seat lengthwise direction L. Especially preferably, the rod element 6 is configured as a square tube, with cylindrical projections 24, 24', which especially preferably are arranged on the end faces of the rod element 6.

The cylindrical projections 24, 24' are introduced into the first recess 46 and into the second recess 47, so that the rod element 6 is rotatably mounted with respect to the side horizontal suspension 4. Preferably a displacement element 57 is introduced into the recesses 46', 47' and a spring rod 56, which is elastically deformable, is introduced into the recesses 46", 47".

Further, a connection element 58 is provided, which can be moved relative to the rod element 6 and which at least partly encloses the rod element, in particular. The connection element 58 is likewise connected to the displacement element 57, but not directly connected, by means of which the connection element 58 can be moved. Finally, the connection element 58 is connected to the spring rod 56.

Upon a rolling movement of the vehicle seat 1, resulting in a rotation of the rod element 6 with respect to the side horizontal suspension 2, the connection element 58 is also correspondingly rotated, due to the configuration of the rod element 6. The same also holds for the spring rod 56, so that the spring rod 56 is elastically deformed and a spring action is produced. The displacement element 57, on the other hand, is led in an oblong hole 59 of the connection element 58, so that no force is produced acting on the displacement element 57 upon rotation of the connection element, for otherwise the displacement element might be destroyed or the displacement element would be deformed as an additional spring rod.

The displacement element 57 is preferably configured as a threaded spindle, which can be moved by turning a rotary knob 40, which is connected to the threaded spindle.

Furthermore, a limiting element 68 is provided, which is rigidly connected to the rod element 6. In particular, the limiting element 68 and the rod element 6 are formed as a single piece. The limiting element 68 is formed such that a shifting of the connection element 58 in the vehicle seat lengthwise direction L can be limited in a direction thereof. Likewise, the limiting element 68 may serve in that the first connecting rod element 26 is connected to the rod element 6 in order to secure the position of the axes of rotation 17, 27, 28, 32 and can move along with it during a rolling movement, and therefore does not need to be bent with respect to the first swing 8 or the second swing 9. The connection element 57 can move between the limiting element 68 and the rod element 6. Thanks to the construction of the rolling suspension 5 and especially thanks to the spring rod 56 so provided, the spring action is symmetrically produced, that is, the spring action is equal with respect to a middle of the spring rod 56, depending on the position of the connection element 58. The limiting element 68 is preferably L-shaped and arranged such that it at least partly encloses the connection element 58 together with the rod element 6.

Figure 6D:
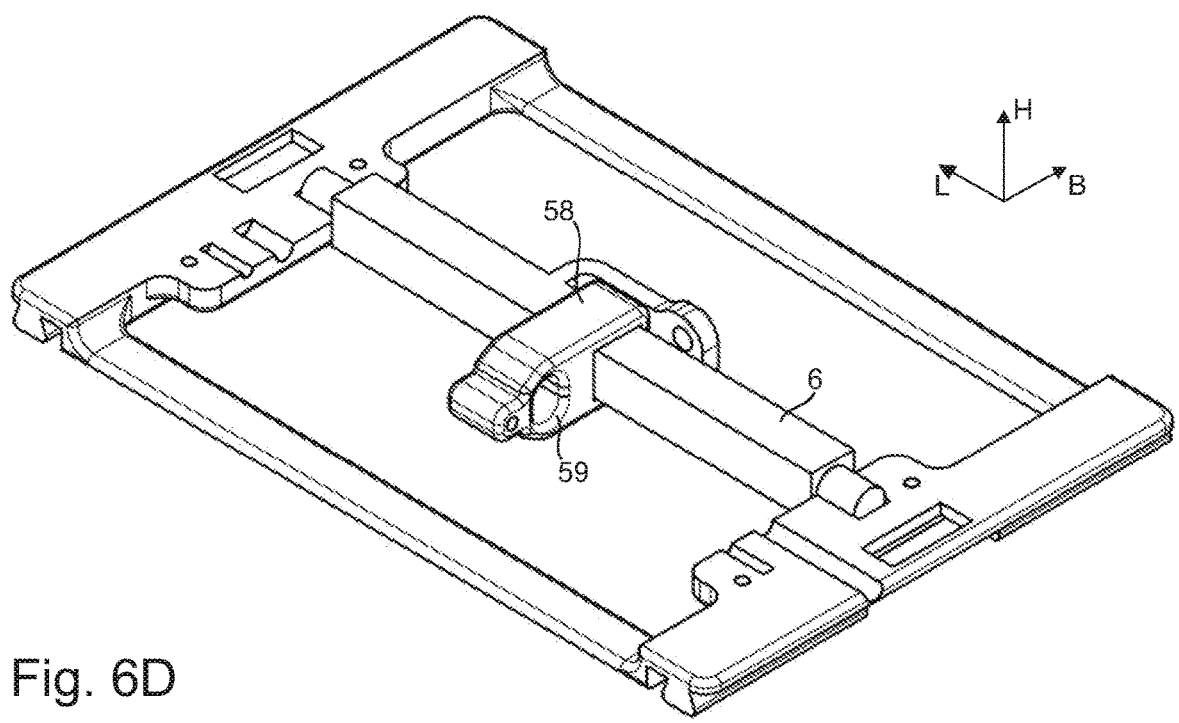

The oblong hole 59 is better seen in FIG. 6D.

Since the displacement element 57 is arranged extending in the oblong hole 59, it is necessary to provide a bracket element 60 with threads. The bracket element 60 partly embraces the connection element 58, so that upon rotation of the threaded spindle the bracket element 60 can be moved by the threads along the spindle, whereby the connection element 58 can be moved along the rod element 6.

Figure 6E:
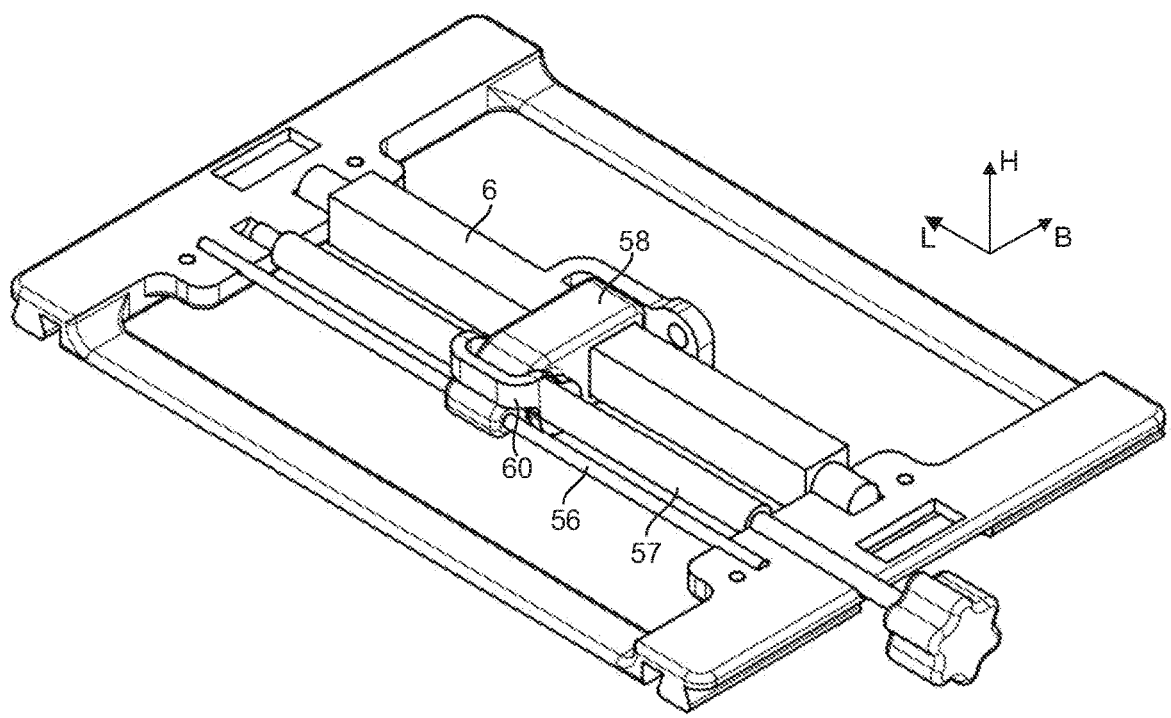

The bracket element 60 can be well seen in FIG. 6E.

Figure 6F:
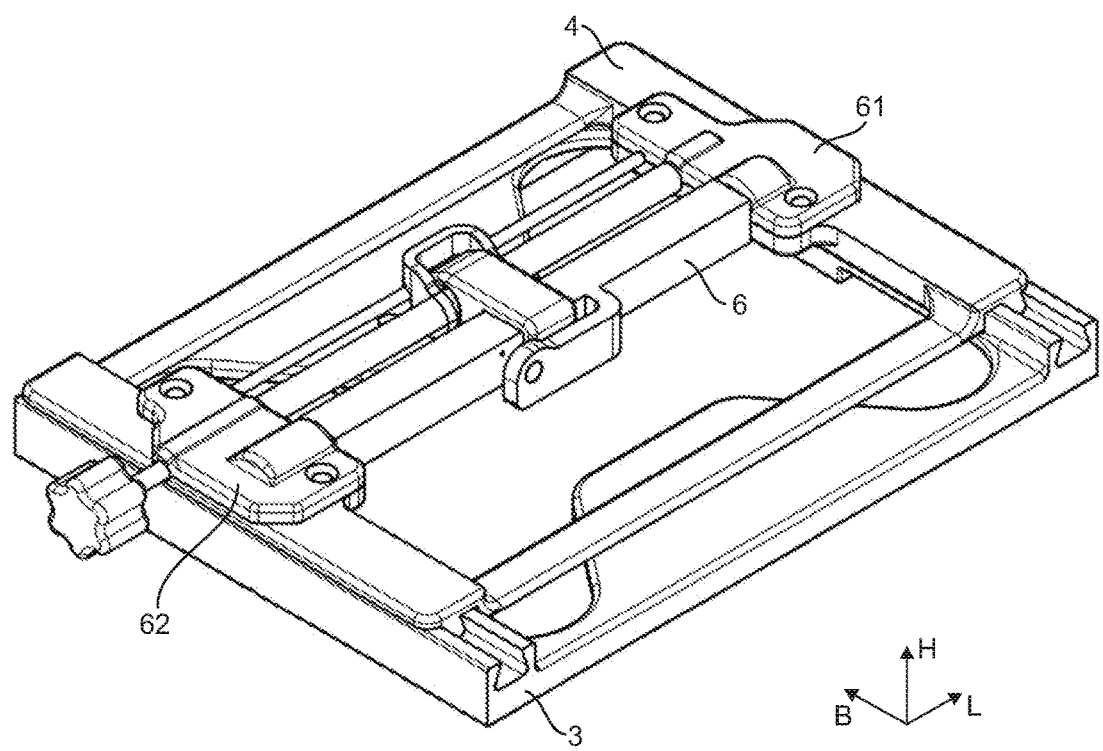

In FIG. 6F, in addition a first holder plate 61 and a second holder plate 62 are provided, by means of which the rod element 6, the spring rod 56 and the connection element 57 are secured against dropping out. The holder plates 61, 62 are connected to the side horizontal suspension 4 in order to enclose the rod element, the spring rod 56 and the connection element 57 in the region of the recesses 46, 46', 46", 47, 47', 47".

Figure 6G:
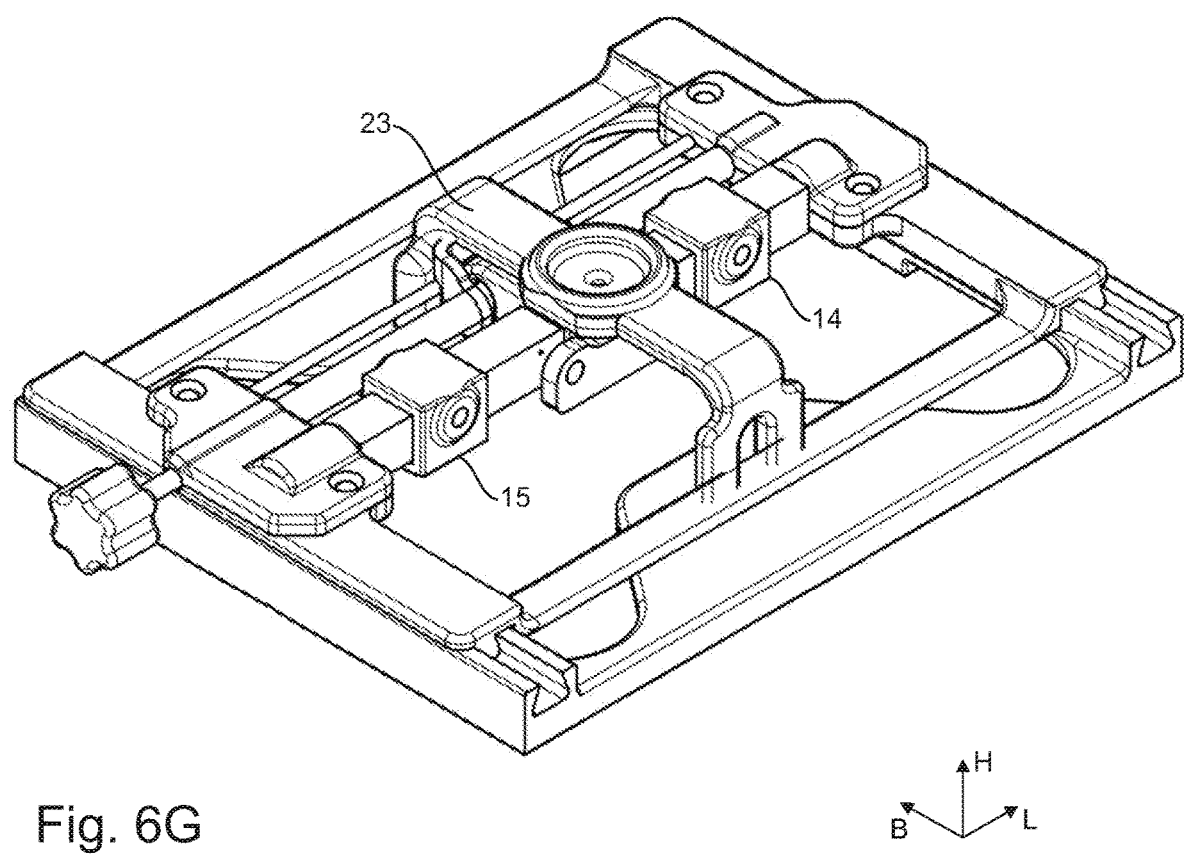

FIG. 6G, on the other hand, shows further components. In addition, a first slide element 14 and a second slide element 15 are provided, being respectively connected in sliding manner to the rod element 6, that is, arranged so as to be displaceable with respect to the rod element 6. The slide elements 14, 15 shall be discussed further in connection with the following figures. The same holds likewise for the second element carrier 23, which is connected to the base plate 3 and encloses the rolling suspension 5.

Figure 6H:
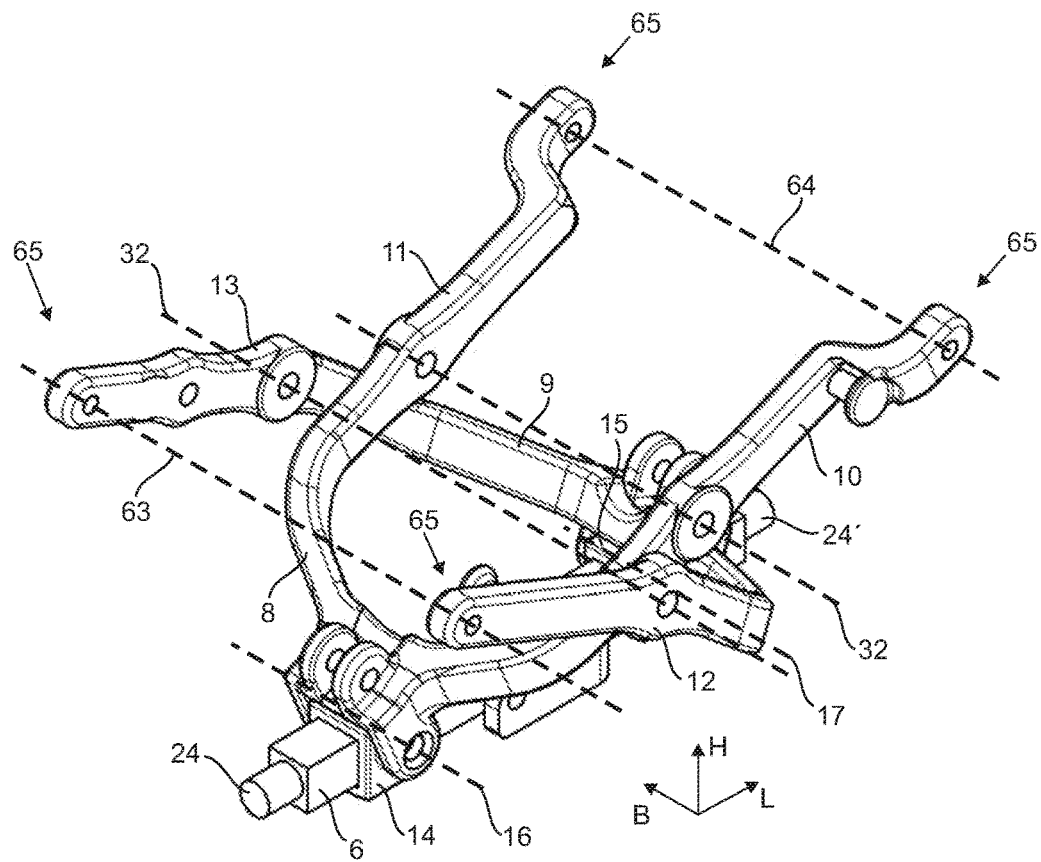

In FIG. 6H, for better visibility, the base plate 3 and the side horizontal suspension 4 as well as parts of the rolling suspension 5 are no longer shown. Only the rod element 6 of the rolling suspension 5 can be seen, as well as the first slide element 14 and the second slide element 15. The first slide element 14 is rotatably connected about the first axis of rotation 16 to the first swing 8, while the second slide element 15 is rotatably connected to the second swing 9 about the second axis of rotation 17. The first swing 8 has a first swing arm 10 and a second swing arm 11, and the second swing 9 has a third swing arm 12 and a fourth swing arm 13.

As can be seen at first in FIG. 6H, the first swing 8 and the second swing 9 are not joined together; that is, especially not as is known in the prior art by means of a common axis of rotation. A connection of the swings 8, 9 together with its effects shall be described more closely in the following.

At the upper ends 65, looking in the vehicle seat height direction H, of each swing arm 10, 11, 12, 13, loose bearings (not shown here) may be arranged, which can be rotatably connected about a fifth axis of rotation 64 of the first swing 8 and a sixth axis of rotation 65 of the second swing 9 to the respective swing 8, 9.

Each of the swing arms 10, 11, 12, 13 has a centre axis 32, such that the spacing of the first axis of rotation 16 from the centre axis 32 is equal to the spacing of the fifth axis of rotation 64 from the first swing 8; the same likewise holds for the second swing 9, the second axis of rotation 17 and the sixth axis of rotation 65. The significance of these centre axes 32 shall be presented more closely in the following figures.

Figure 6I:
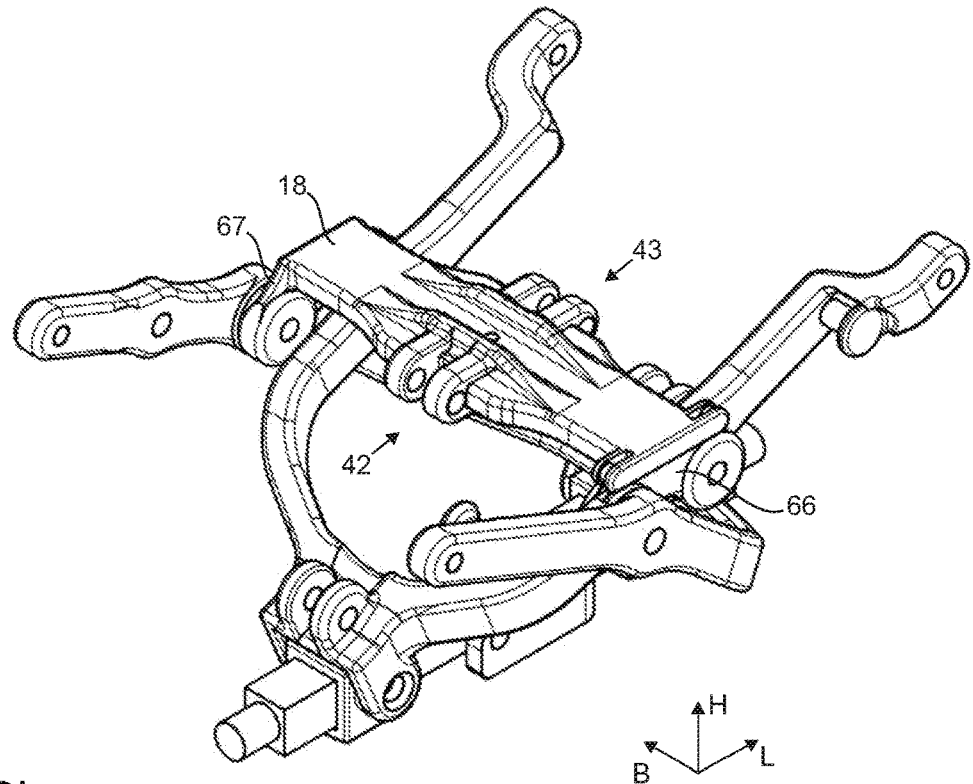

FIG. 6I shows the subject of FIG. 6H further, and in addition a first element carrier 18, where the first element carrier 18 is connected on the one hand rotatably to the first swing arm 10 and the third swing arm 12 and on the other hand rotatably to the second swing arm 11 and the fourth swing arm 13. That is, in particular, by means of the first element carrier 18, on the one hand the first swing arm 10 is connected to the third swing arm 12 and on the other hand the second swing arm 11 is connected to the fourth swing arm 13. For this purpose, the first element carrier 18 has a first connector 66 for connecting the first swing arm 10 and the third swing arm 12 and a second connector 67 for connecting the second swing arm 11 and the fourth swing arm 13. Especially preferably, the first connector 66 is arranged between the first swing arm 10 and the third swing arm 12 and the second connector 67 is arranged between the second swing arm 11 and the fourth swing arm 13, looking in the vehicle seat width direction B.

Further, the upper fastenings 42, 43 are arranged on the first element carrier.

Figure 6J:
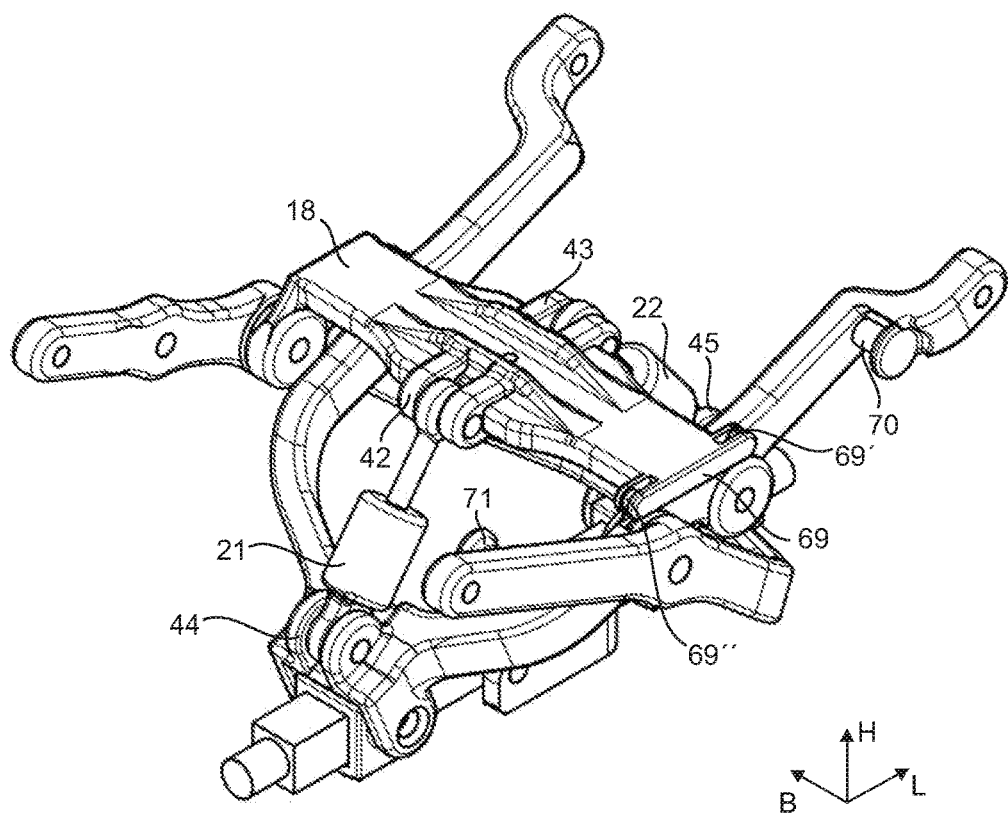

FIG. 6J further shows the first damping element 21 and the second damping element 22, the first damping element 21 being connected to the upper fastening 42 and the lower fastening 44 and the second damping element 22 being connected to the upper fastening 43 and the lower fastening 45, especially in rotatable manner.

Furthermore, the first element carrier 18 comprises a spring suspension element 69 with a first spring suspension element piece 69' and a second spring suspension element piece 69", by means of which spring elements (not shown here) can be connected to the first element carrier. Further, a first spring suspension 70, which is connected to the first swing arm 10, and a second spring suspension 71, which is connected to the third swing arm 12, are provided, in which the spring elements can likewise be connected to the corresponding swing arm 10, 12. The same also holds preferably for the other swing arms 11, 13.

Figure 6K:
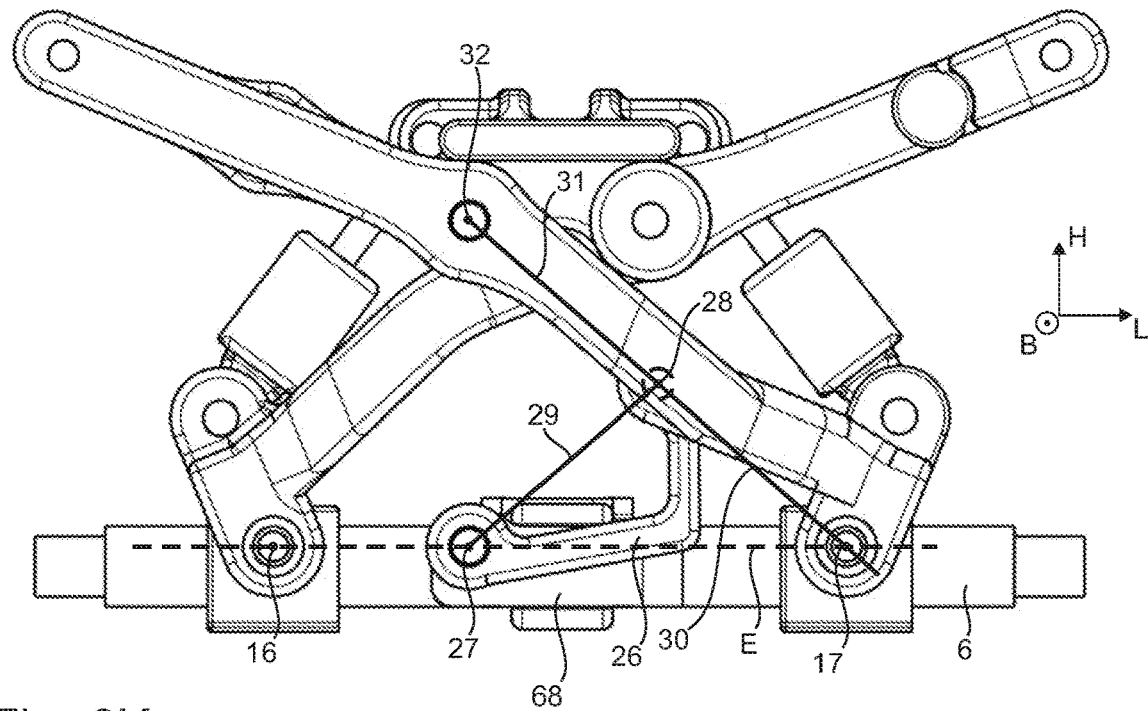

FIG. 6K shows a side view of FIG. 6J, which in addition reveals a first connecting rod element 26, being connected rotatably about a third axis of rotation 27 to the rod element 6 on the one hand and connected rotatably about a fourth axis of rotation 28 to the second swing 9, especially the second swing arm 11, on the other hand. In particular, it is conceivable for the connecting rod element 26 to be connected to the limiting element 68.

The first connecting rod element 26 serves for the centering of the vehicle seat underbody 2 and for further stabilization of the underbody 2, since the swing arms 10, 11, 12, 13 are each provided with loose bearings. The slide elements 14, 15 should also be viewed as being loose bearings.

Certain requirements need to be met for the centering by the first connecting rod element 26: First of all, it is necessary for the first axis of rotation 16, the second axis of rotation 17 and the third axis of rotation 27 to lie in a common plane E, which is preferably subtended by the vehicle seat lengthwise direction L and the vehicle seat width direction B.

Likewise, the first spacing 29, the second spacing 30 and the third spacing 31 must have the same length. The first spacing 29 is the spacing between the third axis of rotation 27 and the fourth axis of rotation 28, the second spacing 30 is the spacing between the second axis of rotation 17 and the fourth axis of rotation 28, and the third spacing 31 is the spacing between the centre axis 32 and the fourth axis of rotation 28.

Furthermore, the second spacing 30 and the third spacing 31 must lie on a common line or in a common plane.

Figure 6L:
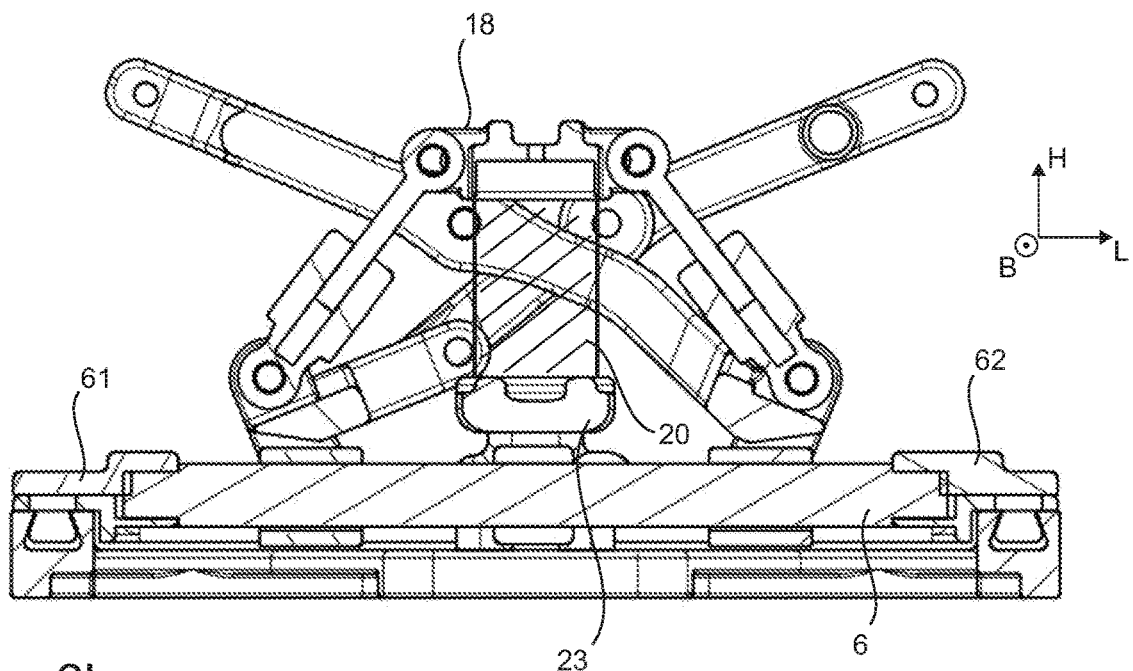

FIG. 6L, on the other hand, shows a cross section of the vehicle seat underbody 2, showing more closely the arrangement of the first element carrier 18 and the second element carrier 23. Likewise, the configuration of the first holder plate 61 and the second holder plate 62 is shown more closely. Between the first element carrier 18 and the second element carrier 23 it is conceivable, in particular, to provide a first spring element 20, such as a pneumatic spring, especially an elastically deformable pneumatic spring, where the pneumatic spring is connected on the one hand to the first element carrier 18 and on the other hand to the second element carrier 23, at least by force locking.

Figure 6M:
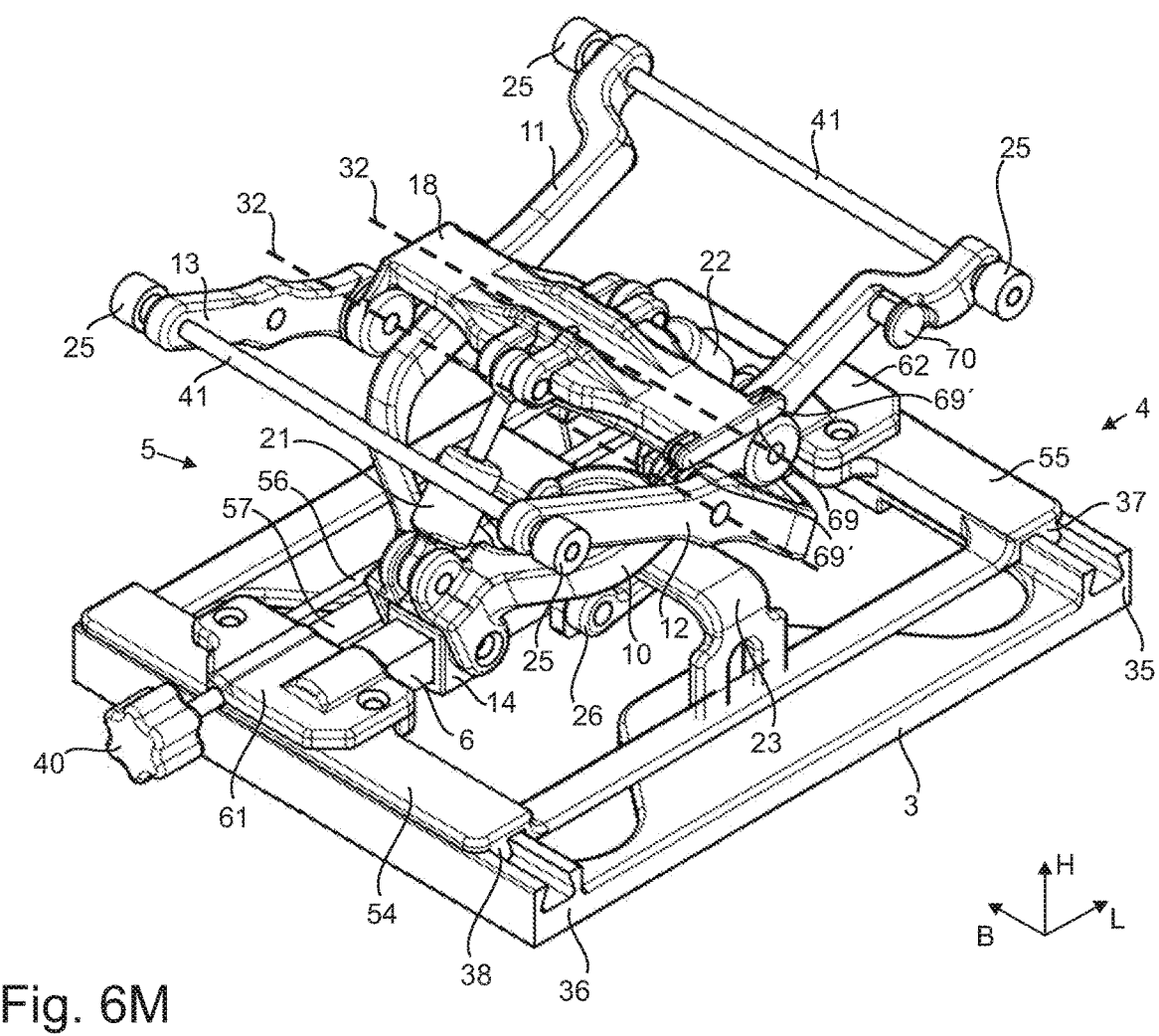

The last FIG. 6M shows the vehicle seat underbody 2 once more completely, with the exception of the lengthwise horizontal suspension 19 (not shown here).

Once again summarizing, any embodiments may be combined and supplemented with each other according to the present invention. The same components are provided with the same reference numbers, and for better clarity it is possible to omit the reference numbers.

It should be further mentioned in conclusion that, thanks to the special configuration of the vehicle seat underbody 2, the vehicle seat underbody 2 may also be installed in a vehicle rotated by 90° with respect to the embodiments shown in the figures. In this case, the rolling suspension depicted becomes the pitch suspension and vice versa. The same holds likewise for the side horizontal suspension and the lengthwise horizontal suspension.

All features disclosed in the application documents are claimed as essential to the invention insofar as they are new, in themselves or in combination, with respect to the prior art.

LIST OF REFERENCE NUMBERS

1 Vehicle seat
2 Vehicle seat underbody
3 Base plate
4 Side horizontal suspension
5 Rolling suspension
6 Rod element
7 Scissors-type frame
8 First swing 9 Second swing
10 First swing arm
11 Second swing arm
12 Third swing arm
13 Fourth swing arm
14 First slide element
15 Second slide element
16 First axis of rotation
17 Second axis of rotation
18 First element carrier
19 Lengthwise horizontal suspension
20 First spring element
21 First damping element
22 Second damping element
23 Second element carrier
24 Cylindrical projection
24' Cylindrical projection
25 Loose bearing
26 First connecting rod element
27 Third axis of rotation
28 Fourth axis of rotation
29 First spacing
30 Second spacing
31 Third spacing
32 Centre axis
33 Top piece
34 Bottom piece
35 First guide rail
36 Second guide rail
37 First slide rail
38 Second slide rail
39 Spring rod
40 Rotary knob
41 Spacing lock
42 Upper fastening
43 Upper fastening
44 Lower fastening
45 Lower fastening
46 First recess
46' First recess
46" First recess
47 Second recess
47' Second recess
47" Second recess
48 First breach
49 Second breach
50 First passageway
51 Second passageway
52 Screw connection
53 Free space
54 First base plate
55 Second base plate
56 Spring rod
57 Displacement element
58 Connection element
59 Oblong hole
60 Bracket element
61 First holder plate
62 Second holder plate
63 Fifth axis of rotation
64 Sixth axis of rotation
65 Upper end
66 First connector
67 Second connector
68 Limiting element
69 Spring suspension element
69' Spring suspension element piece
69" Spring suspension element piece
70 First spring suspension
71 Second spring suspension
S1 Non-swiveled position
S2 Pitching position
S3 Rolling position
S4 Lengthwise movement
S5 Side movement
S6 Vertical movement
L Vehicle seat lengthwise direction
B Vehicle seat width direction
H Vehicle seat height direction

The invention claimed is:

1. A vehicle seat having a vehicle seat underbody, comprising:
a base plate;
a side horizontal suspension connected to the base plate for cushioning movements of the vehicle seat in a vehicle seat width direction;
a rolling suspension for cushioning rolling movements of the vehicle seat comprising a rod element rotatably mounted with respect to the side horizontal suspension;
a scissors link frame having a first swing, comprising a first swing arm and a second swing arm, and a second swing, comprising a third swing arm and a fourth swing arm, wherein the first swing is connected by means of a first displacement element in a movable manner to the rod element and the second swing is connected by means of a second displacement element in a movable manner to the rod element and the first swing is connected rotatably about a first axis of rotation to a first slide element and the second swing is connected rotatably about a second axis of rotation to a second slide element; and
a first element carrier, wherein the first carrier element joins together the first swing arm and the third swing arm, and wherein the first carrier element joins together the second swing arm and the fourth swing arm.

2. The vehicle seat according to claim 1,
wherein the vehicle seat underbody comprises a lengthwise horizontal suspension for cushioning movements of the vehicle seat in a vehicle seat lengthwise direction.

3. The vehicle seat according to claim 1,
wherein the vehicle seat underbody comprises a first spring element, which is connected to the first element carrier and to the base plate or the first swing or the second swing for cushioning movements of the vehicle seat during pitching movements and in a vehicle seat height direction.

4. The vehicle seat according to claim 1,
wherein the vehicle seat underbody comprises a first damping element, which is connected to the first element carrier and to the first swing or the second swing.

5. The vehicle seat according to claim 1,
wherein the vehicle seat underbody comprises a second element carrier, which is rigidly connected to the base plate and the first spring element is connected by means of the second element carrier to the base plate, with the second element carrier extending in the vehicle seat width direction.

6. The vehicle seat according to claim 1,
wherein the first displacement element is configured as the first slide element and the second displacement element as the second slide element, which are connected in sliding manner to the rod element and are preferably made of plastic; or the first displacement element is configured as a first roller element and the second displacement element as a second roller element, which are connected in a rolling manner to the rod element.

7. The vehicle seat according to claim 1, wherein the rod element is configured as a profiled shaft, which has cylindrical projections at its ends, which are rotatably connected to the side horizontal suspension, while the rod element is preferably configured as a square profile.

8. The vehicle seat according to claim 1, wherein a lengthwise horizontal suspension is connected by means of loose bearings to the first swing and the second swing.

9. The vehicle seat according to claim 1, wherein the first element carrier is partly arranged between the first swing arm and the third swing arm and between the second swing arm and the fourth swing arm.

10. The vehicle seat according to claim 1, wherein a first connecting rod element is provided, which is rotatably connected to the rod element about a third axis of rotation and to the second swing about a fourth axis of rotation.

11. The vehicle seat according to claim 10, wherein a first spacing of the third axis of rotation from the fourth axis of rotation is equal to a first spacing of the second axis of rotation from the fourth axis of rotation and equal to a third spacing of the fourth axis of rotation from a center axis of the third swing arm.

12. The vehicle seat according to claim 10, wherein the first connecting rod element is L-shaped.

* * * * *

UNITED STATES PATENT AND TRADEMARK OFFICE
CERTIFICATE OF CORRECTION

PATENT NO. : 10,926,676 B2
APPLICATION NO. : 16/591967
DATED : February 23, 2021
INVENTOR(S) : Florian Dotzler, Erwin Haller and Konstantin Krivenkov Page 1 of 1

It is certified that error appears in the above-identified patent and that said Letters Patent is hereby corrected as shown below:

In the Claims

In Claim 1, Column 12, Line 35, replace "first carrier element" with --first element carrier--
In Claim 1, Column 12, Line 37, replace "first carrier element" with --first element carrier--

Signed and Sealed this
Twentieth Day of April, 2021

Drew Hirshfeld
*Performing the Functions and Duties of the
Under Secretary of Commerce for Intellectual Property and
Director of the United States Patent and Trademark Office*